United States Patent [19]

Kim

[11] Patent Number: 5,069,478
[45] Date of Patent: Dec. 3, 1991

[54] ELECTROMAGNETIC INFLATOR USED IN COMPACT VEHICLE AIR BAG APPARATUS

[76] Inventor: Ki I. Kim, 826 South Berendo St., Los Angeles, Calif. 90005

[21] Appl. No.: 556,967

[22] Filed: Jul. 24, 1990

[51] Int. Cl.$^5$ .............................................. B60R 21/10
[52] U.S. Cl. .................................... 280/733; 280/808; 297/482
[58] Field of Search ...................... 280/733, 801, 808; 297/482

[56]         References Cited
        U.S. PATENT DOCUMENTS 3,841,654 10/1974 Lewis ................................... 280/733
3,897,081  7/1975 Lewis ................................... 280/733
4,348,037  9/1982 Law et al. ........................... 280/733

Primary Examiner—Kenneth R. Rice
Attorney, Agent, or Firm—Irving Keschner

[57]              ABSTRACT

A compact air bag apparatus which comprises an inflatable bag secured to the vehicle shoulder belt. The deployment of the bag is controlled by electronic sensors mounted to the vehicle, the sensors being operative when a collision condition is detected. The air bag is also deployed when a voice sensor is activated by the driver. The air bag, once deployed, is designed to stay inflated, allow the driver to see and continue to control the vehicle after the collision, and to protect the driver from collision impact occurring both from the front of the vehicle and the left side thereof.

4 Claims, 6 Drawing Sheets

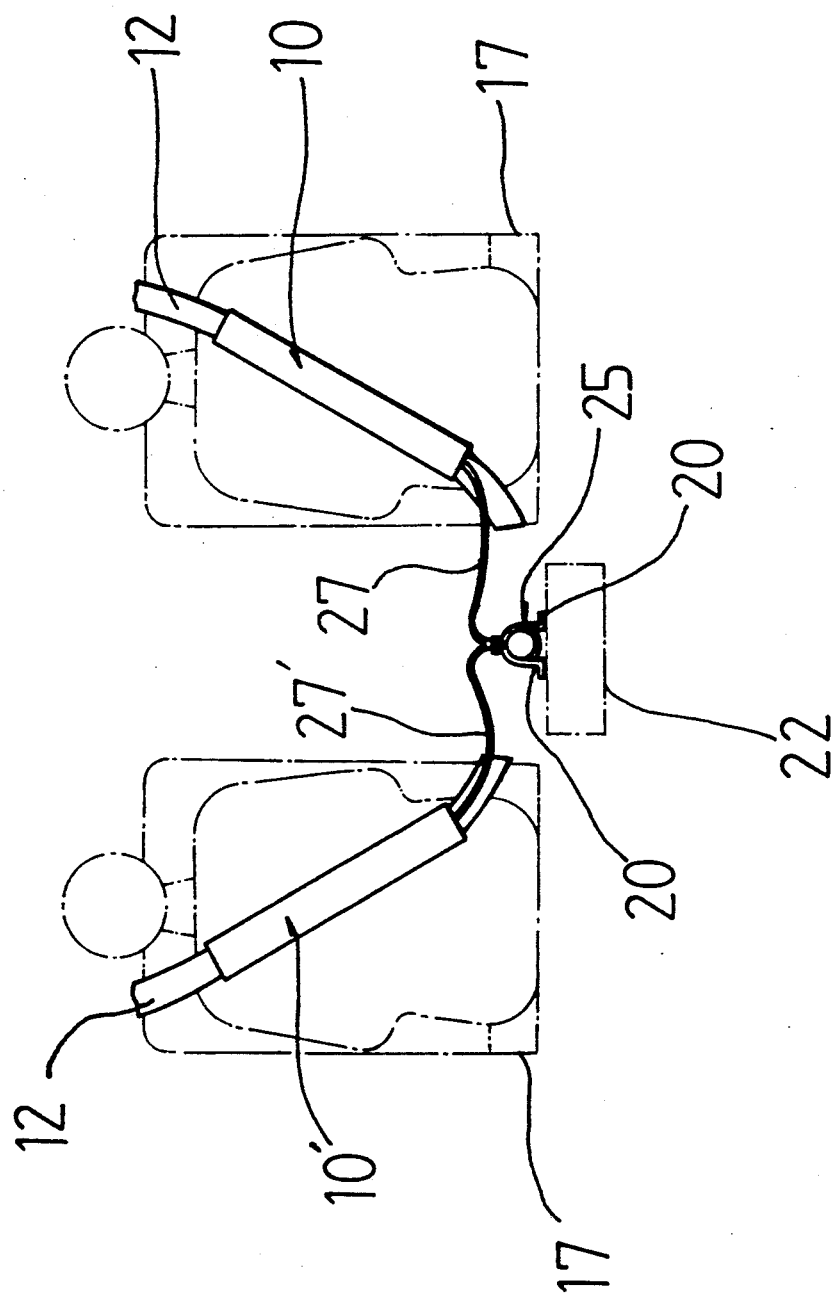

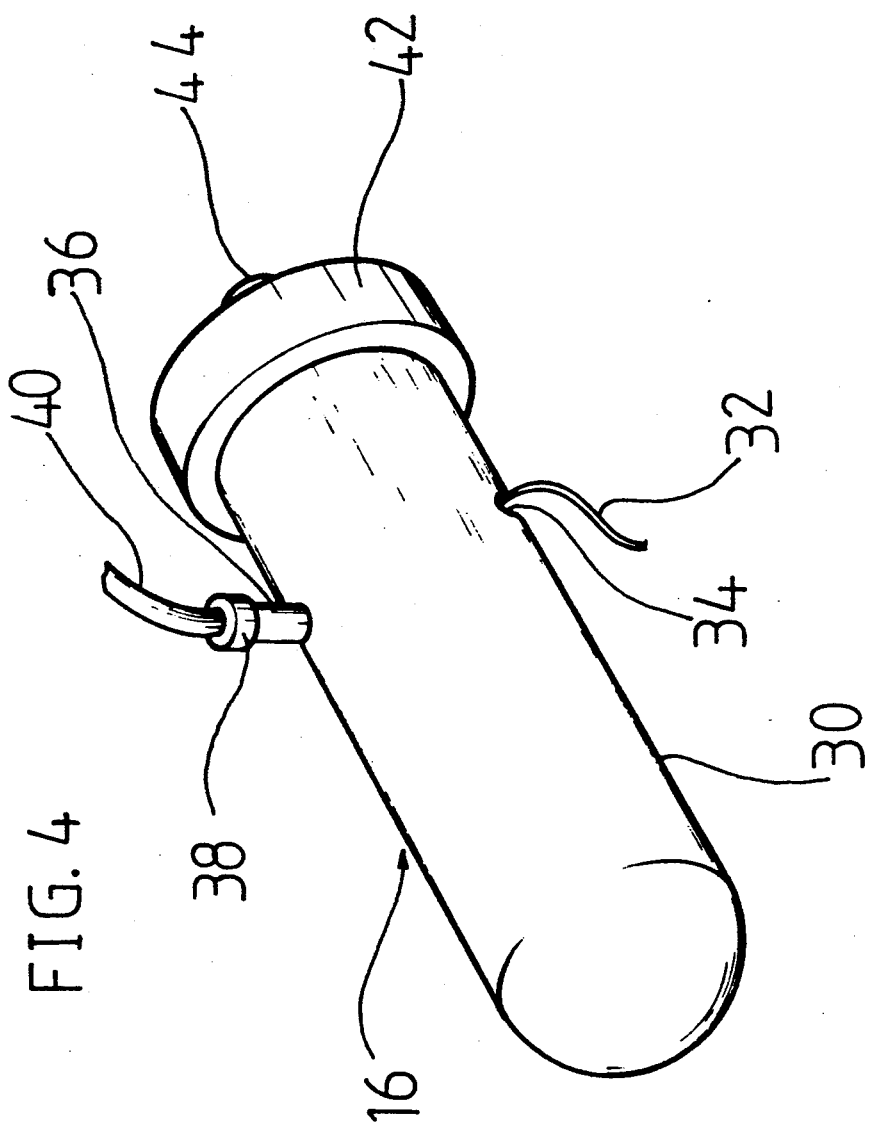

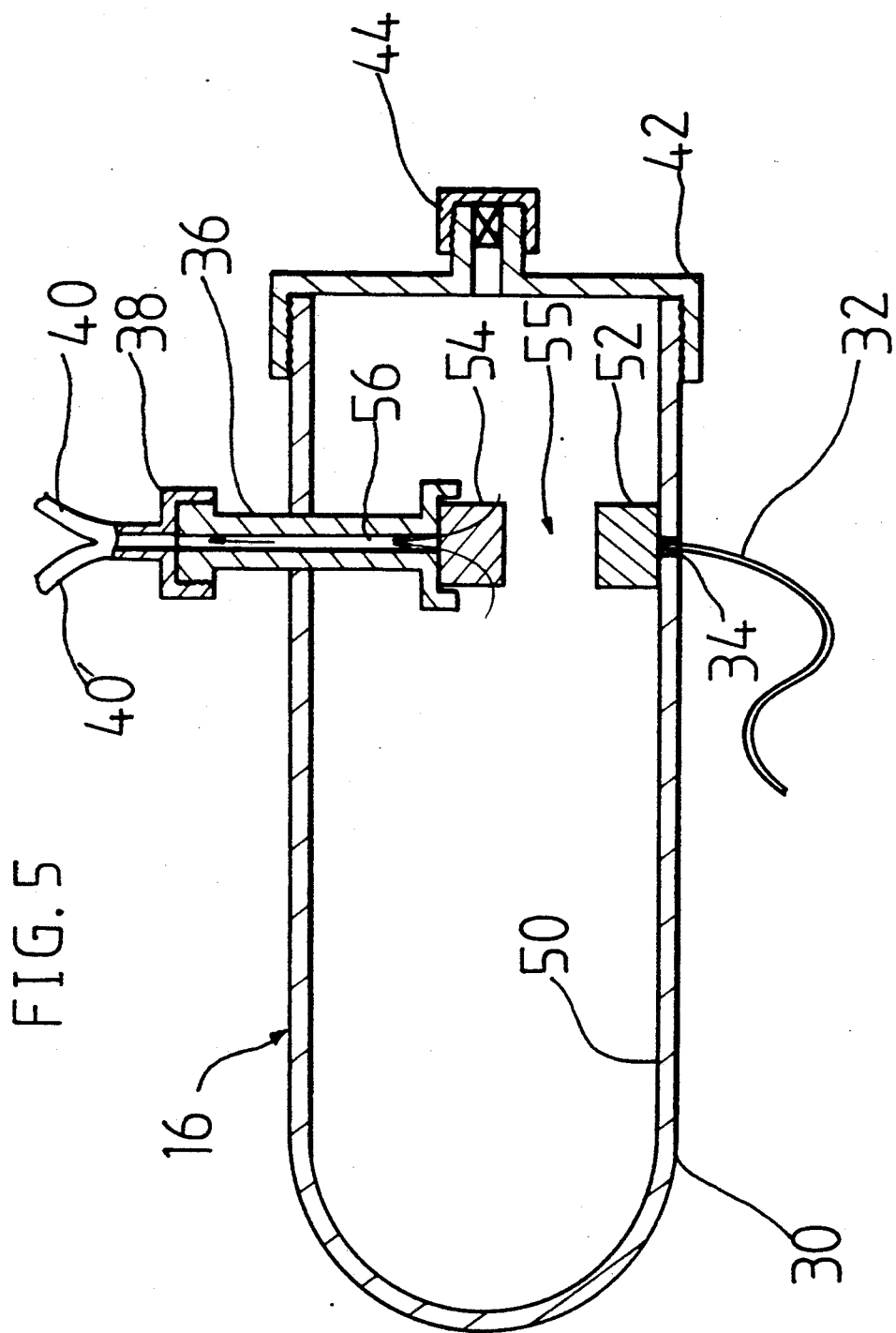

ELECTROMAGNETIC INFLATOR USED IN COMPACT VEHICLE AIR BAG APPARATUS

BACKGROUND OF THE INVENTION

1. Field of the Invention

The present invention relates to a vehicle air bag system, and in particular, to an air bag restraining system which is mounted to the vehicle shoulder belt, the deployment of the air bag being automatically triggered prior to or at the time of a collision by a driver-activated voice sensor.

2. Description of the Prior Art

Belt restraints, both of the lap and shoulder variety, have been installed in vehicles for many years in order to reduce deaths and serious injuries resulting from collisions. Recently, air bag restraints have been installed in vehicles to provide an additional technique for reducing injuries suffered as a result of collisions.

In a typical air bag restraint system, the air bag and the devices necessary to inflate the air bag are installed, for example, in a recess in the vehicle dashboard. When a collision is detected, the air bag is automatically inflated. Typical of the prior art air bag systems are those disclosed in U.S. Pat. No. 3,883,154 to McCullough, Jr. et al. which discloses techniques for using ambient air to assist in deploying the crash restraint bag; U.S. Pat. No. 4,449,728 to Pilatzki which discloses a reinflatable air bag which is automatically inflated when the deceleration of the vehicle is greater than a predetermined amount, the inflated air bag being designed to allow the driver to see after inflation; U.S. Pat. No. 3,831,992 to Allgaier et al. which discloses an inflatable gas cushion which is shaped to minimize neck injuries to a user, and U.S. Pat. No. 4,298,214 to Brown which discloses roof-mounted air bag which is inflated by an electrical signal generated by an impact-sensing device or emergency hand switch.

Although the air bag restraint systems currently available have been designed to provide enhanced features as evidenced by the aforementioned patents, there still are serious drawbacks associated therewith. In particular, the automatic sensors currently utilized respond to impacts, i.e. collisions, and are not designed to inflate the air bag prior to impact. Further, a short time period after deployment, most air bags tend to deflate notwithstanding the real possibility that additional collisions may occur after the initial collision. In addition, air bag systems are designed primarily to protect the front portion of a user's body while ignoring the possibility of injury from a side impact. Finally, the air bag, after deployment, typically cannot be reused without an expensive retrofit. In the case of older cars not having an air bag system originally installed, it is prohibitively expensive to install an air bag restraint system.

Although the use of belt restraints by the vehicle occupants have increased recently in view of statistical evidence that serious injuries and death have been prevented when they are used, shoulder belts after extended use tend to become loose, reducing their effectiveness as a safety device.

Loose belts increase the risk that serious injuries will occur if the vehicle is involved in a collision. Although belt users may be aware that a collision is imminent, they are unlikely to react in time to prepare for the collision and/or attempt to manually tighten the shoulder belt.

Commonly owned copending patent application Ser. No. 323,940 now U.S. Pat. No. 4,971,354, issued Nov. 20, 1990, discloses a vehicle air bag system which overcomes the disadvantages noted above. However, the vehicle air bag actuator mechanism disclosed therein, although satisfactory, relies on actuation of a cord mechanism which may prove unreliable in certain circumstances.

What is therefore desired is to provide an improved air bag and shoulder belt restraint system which overcomes the disadvantages of current systems as noted hereinabove.

SUMMARY OF THE PRESENT INVENTION

The present invention provides an improved air bag apparatus which enables the air bag to automatically deploy in response to electronic sensors or detectors mounted on the vehicle. The air bag is compact and mounted on the vehicle shoulder belt restraint and is also designed to deploy at the same time the seat belt is tightened before a collision or upon impact. The air bag is designed so that when it is deployed it does not inhibit the user from continuing to drive the vehicle after a collision. The air bag remains inflated for a predetermined time period after deployment; once deflated, the air bag can be reused again or simply replaced by the driver. The fact that the air bag system is compact in size and mounted to the shoulder belt allows the system to be retrofitted in vehicles not originally equipped with an air bag restraint system.

The electronic sensors are coupled to a control circuit, the output of the control circuit being in turn coupled to a magnetic inflator. If a collision condition (before or at impact) is detected by one or more of the sensors, at least one signal is generated which is coupled to the inflator tightening the shoulder belt against the user's chest and concurrently causing the air bag to inflate within a short time period after the initial signal is received.

The present invention thus provides an improved inflatable bag apparatus which is more effective in terms of safety than is currently available and is capable of being installed in vehicles not designed with an air bag system at a relatively inexpensive cost, the inflatable bag using air or other gases. In addition, the present invention provides vehicle restraining apparatus which compensates for faulty shoulder belts thus minimizing potential injuries to vehicle occupants. Further, the present invention provides a technique for inexpensively and rapidly replacing the air bag apparatus after it has been deployed.

BRIEF DESCRIPTION OF THE DRAWING

For a better understanding of the invention as well as other objects and further features thereof, reference is made to the following description which is to be read in conjunction with the accompanying drawing wherein:

FIGS. 1, 2 and 3 are simplified views showing the air bag of the present invention mounted to a shoulder seat belt;

FIG. 4 illustrates the inflator device portion of the air bag system;

FIG. 5 is a cross-sectional view of the inflator device shown in FIG. 4;

DETAILED DESCRIPTION OF THE INVENTION

Figure 1:
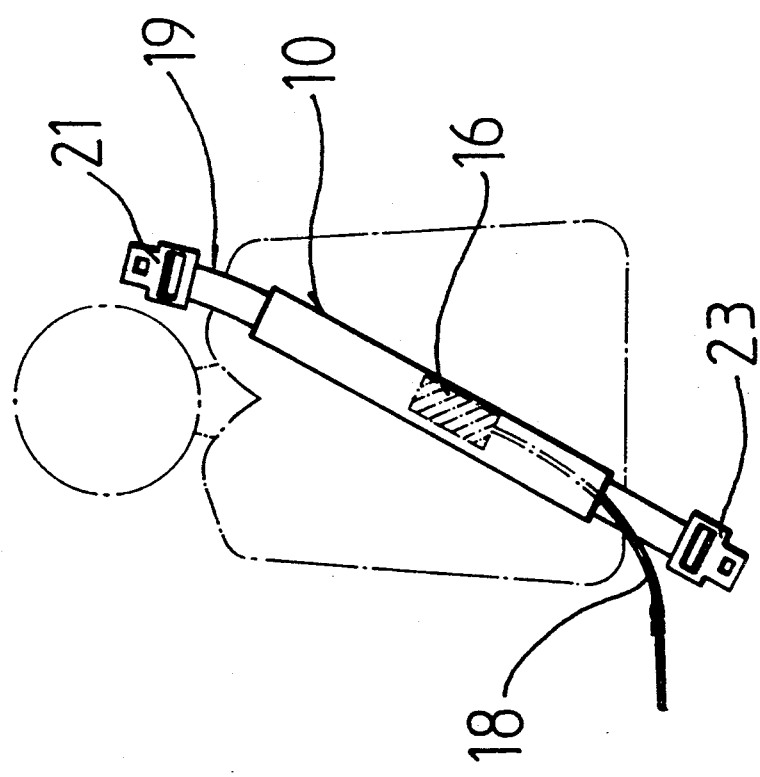

Referring now to FIG. 1, the compact air bag apparatus 10 utilized in the present invention is shown mounted to shoulder seat belt 12. Shoulder belts (and lap belts) are standard safety features found in nearly all vehicles on the road today. Standard shoulder belt 12 of the type shown in FIG. 2 restrains a vehicle occupant (illustrated in phantom) against the back portion of the seat (not shown) occupied by the shoulder belt user. An air bag (not shown) is secured within air bag apparatus 10 mounted to shoulder belt 12 and is inflated automatically in response to signals generated by electronic collision condition sensors. The air bag mounting is accomplished in the same manner as disclosed in the aforementioned patent and the teachings therein necessary for the understanding of the present invention are incorporated herein by reference.

As shown in the FIG. 1 embodiment, a container 16 of solid state ignitor gas, such as nitrogen fuel gas, is mounted in the air bag apparatus 10. Ignition of the gas in container 16 is accomplished by an electrical signal, generated by the sensing system (described hereinafter with reference to FIG. 6), on lead 18. In accordance with a further teaching of the present invention, air bag apparatus 10 may be mounted on a self contained, replaceable shoulder belt portion 19 which includes a buckle member 21, connectible to a receiving member existing in new vehicles, and buckle member 23, connectible to a receiving member also available in newly manufactured vehicles. In this configuration, after the air bag is inflated (deployed), portion 19 can be removed and replaced with an identical portion having the air bag mounted within the apparatus 10 as shown in FIG. 1.

Figure 2:
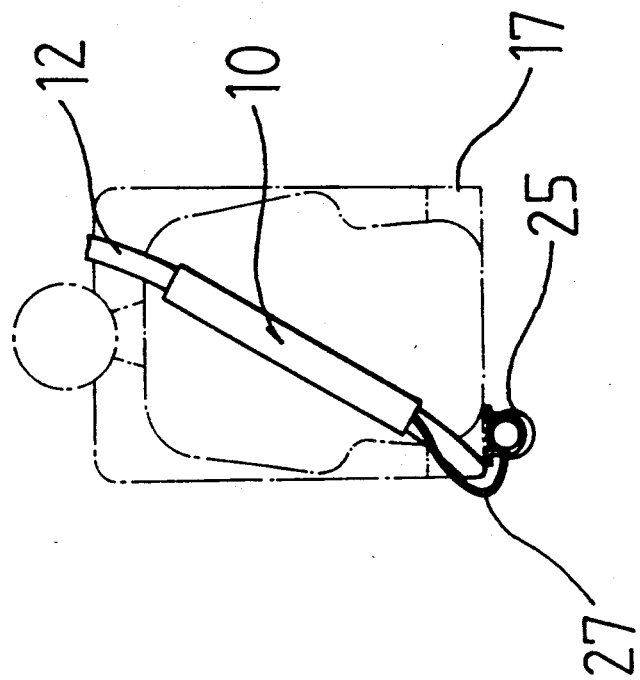

In the embodiment shown in FIG. 2, an electromagnetic inflator device 25 is mounted below the driver's seat 17 instead of within the air bag apparatus 10, released air (or another gas) being fed to the air bag via tubing 27. In the FIG. 3 configuration, the inflator device 25 is mounted by anchors 20 to pedestal 22 mounted within the vehicle between the driver and adjacent passenger. When a collision condition is detected, inflator device 2 is activated and air is provided to the driver air bag apparatus 10 and the passenger air bag apparatus 10' via tubing 27 and 27', respectively.

FIG. 4 is a perspective view of the electromagnetic inflator device 25 comprising a cylindrically shaped housing 30, an electrical wire lead 32 connected to the inside of device 25 through opening 34, tubing 36, connector 38, connecting tubing 40, closure cap 42 and cover 44.

FIG. 5 is a cross-sectional view of the inflator device 25 shown in FIG. 5. Mounted to the inner wall surface 50 is an electromagnet 52 lead 32 being connected thereto as illustrated. In the position shown, i.e. when a collision condition is detected and an electrical signal is generated on lead 32 in response thereto, electromagnet 52 pulls magnet 54 across gap 55 into contact therewith, allowing air, or other gases, stored under pressure within cylindrical cavity 30 to exit the cavity through o opening 56 in metal tubing 36, through branch tubing 40 and 40' (if the configuration shown in FIGS. 1 or 2 is utilized, only one branch tube is necessary) and thereafter coupled to air bag apparatus 10 to inflate the air bag mounted therein. In the normal, or inactivated condition (no collision condition detected), magnet 54 is held in contact with metal tubing 36 to prevent air from entering opening 56. When energized, the electromagnetic force provided by electromagnet 52 is designed to be greater than the attractive force between magnet 54 and metal tubing 36.

The gases which are typically used in inflator devices, such as nitrogen or carbon dioxide, may also be used in the embodiment shown in FIGS. 2-5.

Figure 6:
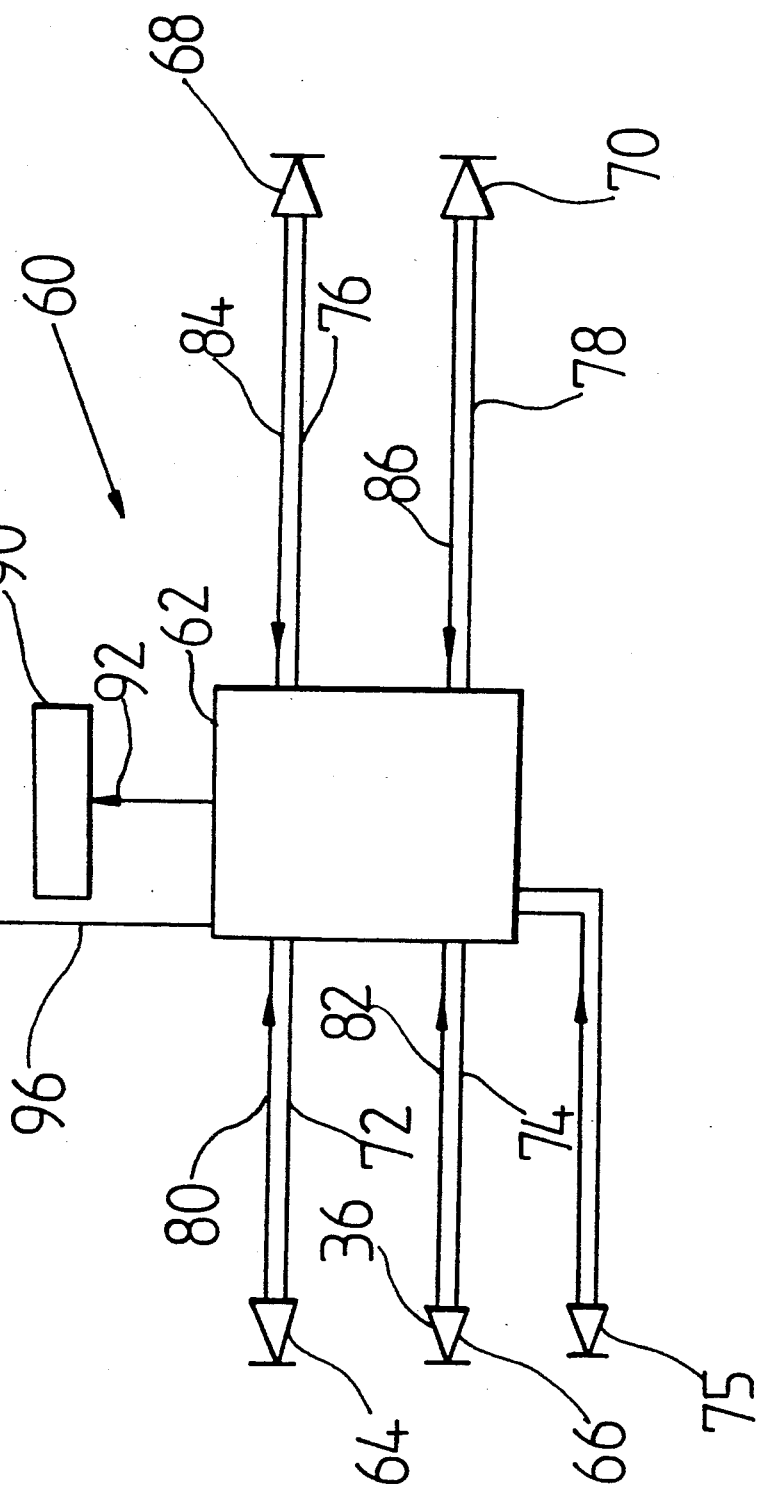
FIG. 6 is an electrical block diagram of a control system which may be utilized with the inflator device of the present invention.

Referring now to FIG. 6, a block diagram of the control apparatus 60 of the present invention is illustrated.

Apparatus 60 comprises control circuit 62, electronic sensors, or detectors, 64 and 66 mounted on the front of the vehicle and electronic sensors 68 and 70 mounted on the rear of the vehicle.

A battery (not shown) or the output from the vehicle cigarette lighter outlet can be utilized to energize a conventional control circuit 62. The control circuit 62 in turn energizes the electronic sensors 64, 66, 68 and 70 on leads 72, 74, 76 and 78, respectively. If any of the electronic sensors detect an object within a predetermined distance from the vehicle (i.e., 10 feet) or any other collision condition, such as an actual collision, the return electrical signal on leads 80 (sensor 64), 82 (sensor 66), 84 (sensor 68) and/or 86 (sensor 70) is coupled to an electrical signal shaping circuit 90 via control circuit 62 and lead 92, causing the electrical current to either ignite the gas (FIG. 1 embodiment) or energize electromagnet 52, causing gas from container 30 to flow into the air bag. A voice sensor 78 may be provided and causes the air bag to inflate when a vehicle occupant speaks a predetermined message. An optional alarm speaker 94 can also be provided to warn the vehicle occupants that a collision is imminent via a signal on lead 96.

Figure 7:
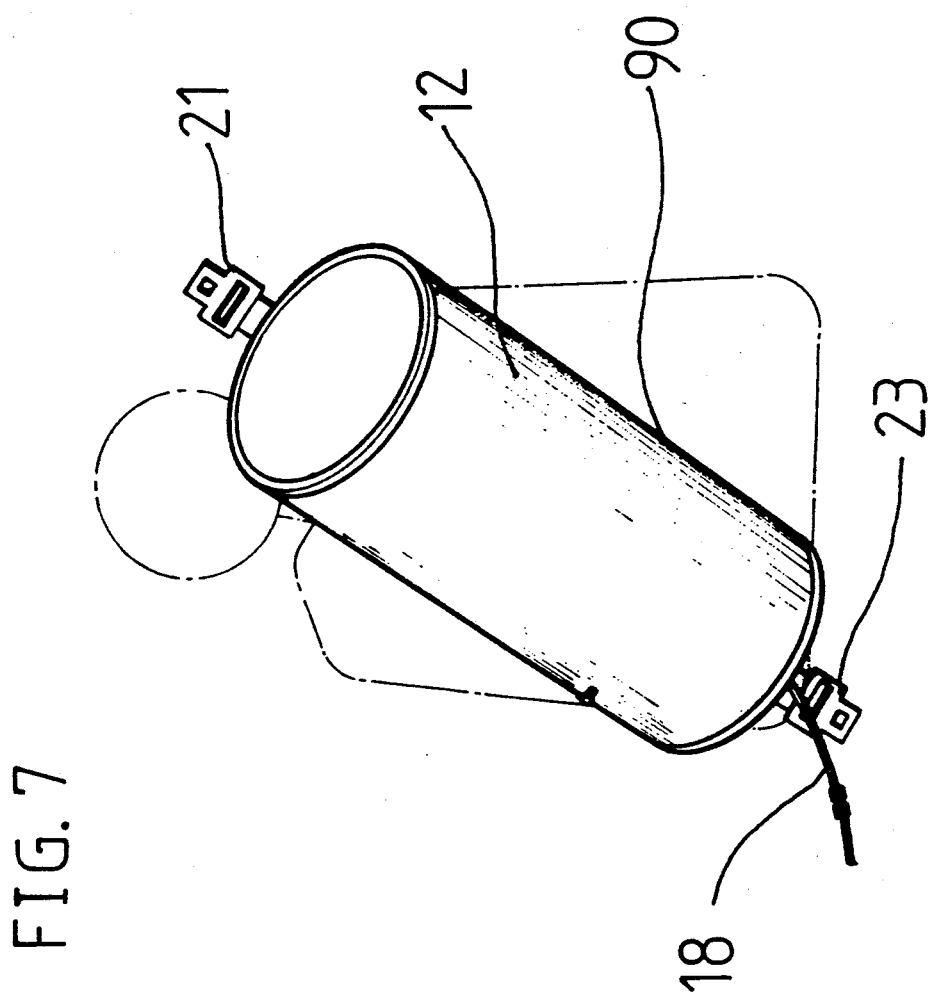
FIG. 7 illustrates the air bag after deployment.

FIG. 7 illustrates the deployment of an air bag 90 after a signal is generated on lead 18 (FIG. 1 embodiment). The air bag deployment is identical to the deployment described in the in the above-identified patent.

The present invention thus provides a compact air bag restraint apparatus which can be incorporated in new or used vehicles in a relatively inexpensive manner. In addition, the mode of operation compensates for faulty shoulder belts, the shoulder belt being automatically tightened when the vehicle's sensor systems detect a collision condition and the air bag is deployed. Further, the magnetic inflator device provides a more reliable technique for inflating air bags than heretofore has been available. The fact that the air bag apparatus can be easily replaced after deployment also reduces the maintenance costs associated therewith.

While the invention has been described with reference to its preferred embodiment, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. Safety apparatus for a vehicle having a passenger compartment and a shoulder belt for restraining an occupant of the vehicle comprising:

inflatable bag mounted on a portion of said shoulder belt and movable between a collapsed, inoperative position and an inflated, operative position, for restraining an occupant of the vehicle during a collision;

means operatively associated with said air bag for automatically inflating said bag when energized by a sensor signal, said inflating means comprising a container for pressurized gas, first and second magnetic means mounted within said container, said first magnetic means positioned adjacent a member having an opening which allows gas to exit from said container, said first magnetic means being in a first position when said sensor signal is generated and in a second position when said sensor is not generated, gas being released from said container to inflate said bag when said member is in said first position; and sensor means operatively associated with said vehicle for generating said sensor signal when a collision condition is detected.

2. The apparatus of claim 1 wherein said container is mounted within the interior of said vehicle.

3. The apparatus of claim 1 wherein said seat belt portion is removable from the remainder of said shoulder belt.

4. Safety apparatus for a vehicle having a passenger compartment and a shoulder belt for restraining an occupant of the vehicle comprising:

an inflatable bag mounted on a portion of said shoulder belt and movable between a collapsed, inoperative position and an inflated, operative position, for restraining an occupant of the vehicle during a collision, said seat belt portion being removable from the remainder of said shoulder belt;

means for automatically inflating said bag when energized by a sensor signal; and sensor means operatively associated with said vehicle for generating said sensor signal when a collision condition is detected.

* * * * *